United States Patent
Inui et al.

(10) Patent No.: US 9,352,273 B2
(45) Date of Patent: May 31, 2016

(54) DEHYDRATION-COMPRESSION SYSTEM AND $CO_2$ RECOVERY SYSTEM

(71) Applicant: MITSUBISHI HEAVY INDUSTRIES, LTD., Tokyo (JP)

(72) Inventors: Masayuki Inui, New York, NY (US); Takahito Yonekawa, New York, NY (US); Cole Maas, New York, NY (US); Tatsuya Tsujiuchi, New York, NY (US)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 164 days.

(21) Appl. No.: 14/189,727

(22) Filed: Feb. 25, 2014

(65) Prior Publication Data

US 2015/0238893 A1 Aug. 27, 2015

(51) Int. Cl.
*B01D 53/14* (2006.01)

(52) U.S. Cl.
CPC ........ *B01D 53/1475* (2013.01); *B01D 53/1418* (2013.01); *B01D 53/1425* (2013.01); *B01D 2252/20478* (2013.01); *Y02C 10/06* (2013.01); *Y02P 20/152* (2015.11)

(58) Field of Classification Search
CPC ............... B01D 2252/20478; B01D 53/1418; B01D 53/1425; B01D 53/1475
See application file for complete search history.

(56) References Cited

U.S. PATENT DOCUMENTS

| | | | | |
|---|---|---|---|---|
| 2009/0101007 | A1* | 4/2009 | Find | B01D 53/002 95/42 |
| 2009/0255181 | A1* | 10/2009 | Rhinesmith | B01J 8/0207 48/127.9 |
| 2012/0014861 | A1 | 1/2012 | Hirata et al. | |

FOREIGN PATENT DOCUMENTS

| | | |
|---|---|---|
| JP | 2007-254270 A | 10/2007 |
| JP | 2010-241630 A | 10/2010 |
| JP | 2010-253370 A | 11/2010 |
| JP | 2012-514533 A | 6/2012 |

OTHER PUBLICATIONS

International Search Report dated May 19, 2015, issued in counterpart application No. PCT/JP2015/055057 (w/English translation) (6 pages).
Written Opinion dated May 19, 2015, issued in counterpart application No. PCT/JP2015/055057 (w/English translation) (6 pages).

* cited by examiner

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

There is provided a dehydration-compression system 10 in which $CO_2$ loss is suppressed, and a $CO_2$ recovery system including the dehydration-compression system. The dehydration-compression system 10 of the present invention includes multiple compressors 50 and a dehydration device 60. The dehydration device 60 includes: a contactor 62 which removes $H_2O$ contained in $CO_2$ by absorbing the $H_2O$ into an dehydration solvent; a recovery part 74 which recovers the $CO_2$ from the dehydration solvent discharged from the contactor 62; and a first circulating passage $L_{31}$ which carries the $CO_2$ released from the recovery part 74 to the upstream side of the contactor 62.

8 Claims, 4 Drawing Sheets

US 9,352,273 B2

DEHYDRATION-COMPRESSION SYSTEM AND $CO_2$ RECOVERY SYSTEM

BACKGROUND OF THE INVENTION

1. Field of the Invention

The present invention relates to a dehydration-compression system for dehydrating and compressing $CO_2$ recovered from exhaust gas, and to a $CO_2$ recovery system including the dehydration-compression system.

2. Description of Related Art

A dehydration-compression system (e.g., Japanese Unexamined Patent Application, Publication No. 2010-241630 (hereinafter referred to as "JP 2010-241630")) recovers $CO_2$ from exhaust gas discharged from an industrial facility, for example, a boiler or a gas turbine, and dehydrates/compresses the recovered $CO_2$. For effective utilization of this dehydrated/compressed $CO_2$, there are plans to inject the $CO_2$ into an oilfield by the enhanced oil recovery (EOR) method, or store it in an aquifer aiming at combating global warming.

If moisture ($H_2O$) remains in the compressed $CO_2$, the moisture can condense during a transport process through a pipeline, etc. The condensed moisture causes corrosion of the pipeline and its ancillary equipment/machines, clogging of the pipeline due to generation of hydrate, and the like. For this reason, the moisture is removed from the $CO_2$ by providing a dehydrating tower before the compressors, between the compressors, or after the compressors, which brings the $CO_2$ and a liquid dehydration solvent such as triethylene glycol (TEG) or diethylene glycol (DEG) into contact with each other to absorb the moisture into the dehydration solvent. In the dehydration system of JP 2010-241630, TEG or the like after removing moisture is treated by combustion decomposition.

In another dehydration system proposed, a separation means for separating a dehydration solvent and moisture in a downstream stage of a dehydrating tower is installed, and the moisture is desorbed from the dehydration solvent having absorbed the moisture to thereby regenerate and recirculate the dehydration solvent to a dehydrating tower.

In the conventional dehydration systems, the moisture separated from a process fluid being dehydrated is commonly discharged to the outside of the system.

$CO_2$ has affinity with a liquid dehydration solvent such as TEG and DEG. In the dehydration method using TEG or DEG, part of the $CO_2$ is also absorbed into the dehydration solvent when $CO_2$ and the dehydration solvent are brought into contact with each other. Thus, loss of the $CO_2$ recovered by a $CO_2$ recovery device occurs in the dehydration process.

Having been devised in view of the above problems, the present invention aims to provide a dehydration-compression system in which $CO_2$ loss is suppressed, and a $CO_2$ recovery system including the dehydration-compression system.

BRIEF SUMMARY OF THE INVENTION

According to a first aspect of the present invention, there is provided a dehydration-compression system including: multiple compressors for compressing $CO_2$ containing $H_2O$; and a dehydration device for separating the $H_2O$ from the $CO_2$, wherein the dehydration device comprises: a contactor which removes the $H_2O$ from the $CO_2$ by bringing the $CO_2$ and a dehydration solvent into contact with each other and absorbing the $H_2O$ into the dehydration solvent; a dry $CO_2$ carrying passage where the $CO_2$ with the $H_2O$ removed flows through; a first recovery part which recovers the $CO_2$ from the dehydration solvent discharged from the contactor; and a first circulating passage which carries the $CO_2$ discharged from the first recovery part, to a flow passage on the upstream side of the contactor.

In the first aspect, the dehydration device may be installed on the upstream side of the multiple compressors.

In the first aspect, the dehydration device may be installed between adjacent compressors of the multiple compressors with respect to a flow of the $CO_2$ or on the downstream side of the multiple compressors, and the first circulating passage may be connected with a flow passage on the upstream side of the compressor located on the upstream side of the contactor.

In this case, the first circulating passage may branch at an intermediate position, and the first circulating passage may be connected with the flow passage on the upstream side of the compressor located on the upstream side of the contactor, and with a flow passage between the compressor and the contactor.

In the first aspect, it is preferable that a first pressure regulating part, which regulates the pressure of the $CO_2$ flowing through the first circulating passage, at an intermediate position of the first circulating passage.

According to a second aspect of the present invention, there is provided a $CO_2$ recovery system including: a $CO_2$ absorbing tower which brings exhaust gas containing $CO_2$ and a $CO_2$ absorbing liquid into contact with each other to remove the $CO_2$ from the exhaust gas; an absorbing liquid regenerating tower which causes the $CO_2$ absorbing liquid having absorbed the $CO_2$ in the $CO_2$ absorbing tower to release the $CO_2$; and the dehydration-compression system of the first aspect which compresses the $CO_2$ released in the absorbing liquid regenerating tower and removes the $H_2O$ contained in the $CO_2$.

In the present invention, the $CO_2$ absorbed into the dehydration solvent in the dehydration device is separated from the dehydration solvent and then circulated to the flow passage on the upstream side of the contactor. This configuration allows a reduction in the amount of $CO_2$ to be discharged from the dehydration device to the outside of the system.

In the first aspect, it is preferable that the dehydration-compression system further includes a second recovery part which recovers the $CO_2$ from the dehydration solvent discharged from the first recovery part, wherein the second recovery part and the first circulating passage are connected in the second circulating passage, and the $CO_2$ discharged from the second recovery part is carried to the upstream side of the contactor.

The recovery rate of the $CO_2$ from the dehydration solvent can be increased by thus providing multiple stages of recovery parts. As a result, $CO_2$ loss in the dehydration device can be significantly reduced, and the final amount of $CO_2$ to be recovered (dry $CO_2$) can be increased.

In this case, it is preferable that a second pressure regulating part is installed at an intermediate position of the first circulating passage, and the second circulating passage is connected with the second pressure regulating part, the second pressure regulating part regulating the pressure of the $CO_2$ discharged from the second recovery part and mixing the $CO_2$ discharged from the second recovery part with the $CO_2$ discharged from the first recovery part.

The pressures are low inside the first recovery part and the second recovery part which recover the $CO_2$. Since the second recovery part is located on the downstream side of the first recovery part, the pressure of the gas discharged from the second recovery part is lower than the pressure of the gas discharged from the first recovery part. When there is a large difference between the gas pressures, the gas discharged from the second recovery part cannot be pressed into the gas discharged from the first recovery part. In the dehydration-compression system of the present invention, therefore, the second pressure regulating part is installed to adjust the gas pressure levels. In this case, adjusting the pressure level to higher one of the pressure levels can reduce the power required for actuation of the second pressure regulating part.

In the first aspect, it is preferable that a scrubber is installed on the upstream side of the compressors, and the $CO_2$ flowing through the first circulating passage is carried to the upstream side of the scrubber.

$CO_2$, etc. discharged from the first recovery part or the second recovery part can contain the dehydration solvent in the form of mist. It is concerned that this dehydration solvent in the form of mist may flow into the compressor and affect the performance of the compression function. By supplying the $CO_2$, etc., circulated from the dehydration device, via the scrubber to the compressor, the dehydration solvent in the form of mist can be removed from the process fluid in the scrubber, which is advantageous in that the dehydration-compression system can be operated stably for a long period of time.

According to the present invention, since a fluid containing the $CO_2$ released during regeneration of a dehydration solvent in a dehydration device is circulated to the upstream side of the dehydration device, $CO_2$ loss in the dehydration-compression system can be prevented.

DETAILED DESCRIPTION OF THE INVENTION

Embodiments of a dehydration-compression system and a $CO_2$ recovery system according to the present invention will be described below with reference to the drawings.

Figure 1:
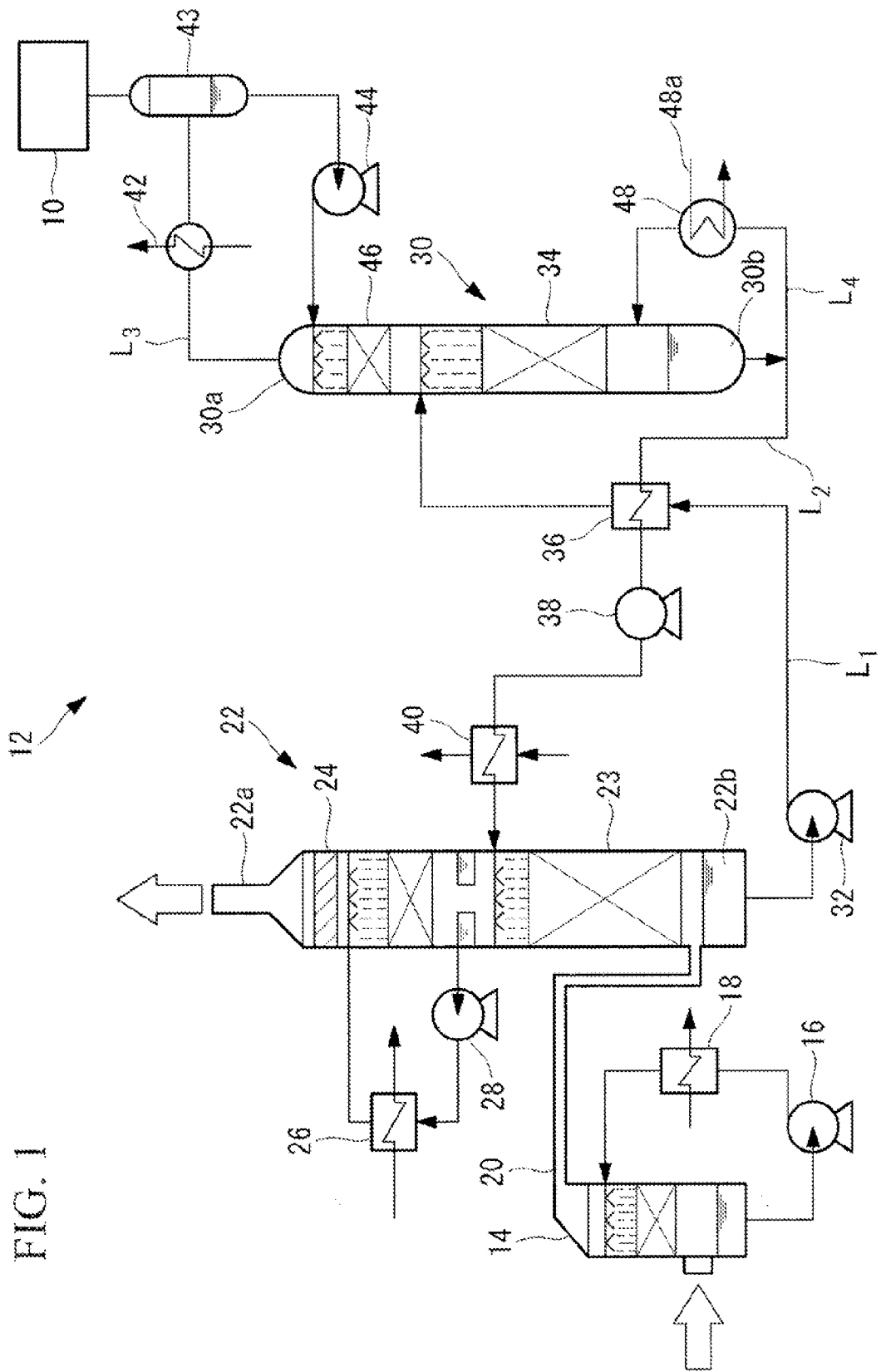
FIG. 1 is a schematic view of a $CO_2$ recovery device.

FIG. 1 is a schematic view of a $CO_2$ recovery device to be installed in the $CO_2$ recovery system.

A $CO_2$ recovery device 12 includes a cooling tower 14, a $CO_2$ compactor 22, and an absorbing liquid regenerating tower 30.

Exhaust gas containing $CO_2$ discharged from an industrial facility, for example, a boiler or a gas turbine, is supplied through a blower (not shown) to the cooling tower 14. The exhaust gas supplied to the cooling tower 14 is cooled by cooling water. The cooling water after cooling the exhaust gas is supplied through a cooler 18 back to the cooling tower 14 by a pump 16, and sprayed inside the cooling tower.

The cooled exhaust gas containing $CO_2$ is supplied through an exhaust gas line 20 from a lower part of the $CO_2$ compactor 22. In the $CO_2$ compactor 22, an alkanolamine-based $CO_2$ absorbing liquid (amine solution), for example, is brought into countercurrent contact with the exhaust gas while passing through a filler 23. This causes the $CO_2$ in the exhaust gas to be absorbed into the $CO_2$ absorbing liquid, so that the $CO_2$ is removed from the exhaust gas discharged from the industrial facility. Purified gas with the $CO_2$ removed is discharged from a tower top part 22a of the $CO_2$ compactor 22.

The purified gas contains steam, etc.; a mist eliminator 24 is provided in an upper part of the $CO_2$ compactor 22 to separate and remove the steam, etc. from the purified gas by condensing the steam, etc.

The $CO_2$ compactor 22 is further provided with a cooler 26 which is installed outside the $CO_2$ compactor 22, and a pump 28 which circulates part of the condensed water between the cooler 26 and the $CO_2$ compactor. As the condensed water, etc. cooled in the cooler 26 and supplied to the upper part of the $CO_2$ compactor 22 maintains the mist eliminator 24 at a low temperature, the purified gas passing through the mist eliminator 24 is more reliably cooled.

The $CO_2$ absorbing liquid having absorbed the $CO_2$ in the $CO_2$ compactor 22 is accumulated in a tower bottom part 22b, and supplied by a pump 32, from a liquid feeding line $L_1$ connecting the tower bottom part 22b of the $CO_2$ compactor 22 and an upper part of the absorbing liquid regenerating tower 30, to the absorbing liquid regenerating tower 30, and is sprayed toward a filler 34 inside the absorbing liquid regenerating tower. A liquid feeding line $L_2$ connecting a tower bottom part 30b of the absorbing liquid regenerating tower 30 and the upper part of the $CO_2$ compactor 22 is provided between the $CO_2$ compactor 22 and the absorbing liquid regenerating tower 30. A heat exchanger 36 for exchanging heat between a rich solution ($CO_2$ absorbing liquid having absorbed $CO_2$) and a lean solution ($CO_2$ absorbing liquid with $CO_2$ removed) is provided in an intersecting portion between the liquid feeding line $L_1$ and the liquid feeding line $L_2$. In the heat exchanger 36, the rich solution is heated while the lean solution is cooled.

Due to concurrent contact while passing through the filler 34 in the absorbing liquid regenerating tower 30, the $CO_2$ absorbing liquid having absorbed the $CO_2$ (rich solution) undergoes an endothermic reaction, which causes release of the $CO_2$. By the time the rich solution reaches the tower bottom part 30b of the absorbing liquid regenerating tower 30, a large part of the $CO_2$ has been removed, and the rich solution is regenerated as the lean solution. The regenerated lean solution is supplied by a pump 38 through a lean solution cooling device (not shown) back to the $CO_2$ compactor 22 to be reused as the $CO_2$ absorbing liquid.

The lean solution regenerated by releasing the $CO_2$ in the absorbing liquid regenerating tower 30 is returned by the pump 38 through the liquid feeding line $L_2$ to the $CO_2$ compactor 22. While being returned, the lean solution is cooled in the heat exchanger 36 by heat exchange with the absorbing liquid, which is supplied from the $CO_2$ compactor 22 to the absorbing liquid regenerating tower 30, and then cooled by a water-cooling cooler 40 to a temperature suitable for absorbing $CO_2$.

Reference sign $L_3$ denotes a $CO_2$ discharge line connected with a tower top part 30a of the absorbing liquid regenerating tower 30. The $CO_2$ discharged from the absorbing liquid regenerating tower 30 through the $CO_2$ discharge line $L_3$ is cooled through a cooler 42, which uses cooling water, before being supplied to a scrubber 43. The $CO_2$ supplied to the scrubber 43 is separated from steam. The separated $CO_2$ is supplied to the dehydration-compression system 10.

The condensed water separated in the scrubber 43 is returned by the pump 44 to the upper part of the absorbing liquid regenerating tower 30. The returned condensed water cools a condensing part 46 to suppress release of the $CO_2$ absorbing liquid, etc.

Part of the $CO_2$ absorbing liquid accumulated in the tower bottom part 30b of the absorbing liquid regenerating tower 30 is supplied through the circulating passage $L_4$ to a reboiler 48, and heated by heat exchange with high-temperature steam flowing in a steam pipe 48a, before being returned into the absorbing liquid regenerating tower 30. This heating process causes the $CO_2$ to be released from the $CO_2$ absorbing liquid in the tower bottom part 30b, and moreover, the $CO_2$ is released from the $CO_2$ absorbing liquid also during gas-liquid contact above the filler 34 which is indirectly heated.

First Embodiment

Figure 2:
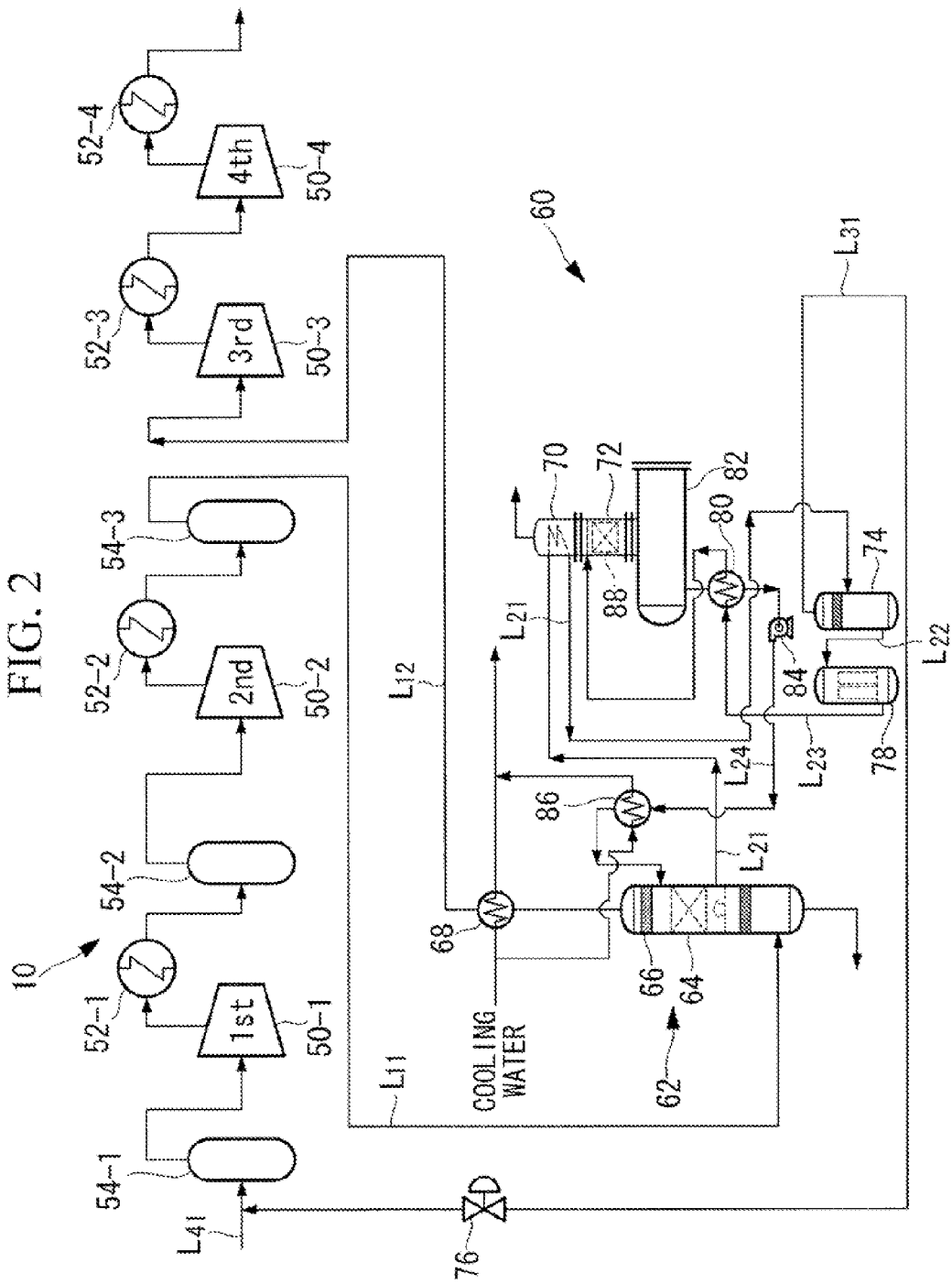
FIG. 2 is a configuration diagram of a dehydration-compression system according to a first embodiment.

FIG. 2 is a configuration diagram of a dehydration-compression system according to a first embodiment.

The dehydration-compression system 10 includes multiple compressors 50 for compressing a process fluid supplied from the $CO_2$ recovery device 12. The multiple compressors 50 are connected in series with respect to a flow of the process fluid. This process fluid is $CO_2$ containing $H_2O$.

FIG. 2 shows the dehydration-compression system 10 in a case where a dehydration device 60 is installed between adjacent compressors of the multiple compressors 50. Hereinafter, the compressors on the upstream side of the dehydration device 60 will be referred to as "upstream stage-side compressors", while the compressors on the downstream side of the dehydration device 60 will be referred to as "downstream stage-side compressors" to describe the embodiment. In the dehydration-compression system 10, four compressors 50-1 to 50-4 are installed, and the dehydration device 60 is connected between the compressor 50-2 and the compressor 50-3. The compressors 50-1 and 50-2 constitute the upstream stage-side compressors, while the compressors 50-3 and 50-4 constitute the downstream stage-side compressors.

Nevertheless, the number of the compressors is not limited to four in this embodiment.

In addition, the installation position of the dehydration device 60 is not limited to that shown in FIG. 2. For example, the dehydration device 60 may be installed between the compressor 50-1 and the compressor 50-2. Alternatively, the dehydration device 60 may be installed on the upstream side of the multiple compressors 50 (i.e., on the upstream side of the compressor 50-1), or may be installed on the downstream side of the multiple compressors 50 (i.e., on the downstream side of the compressor 50-4).

The compressors 50-1 to 50-4 respectively include coolers 52-1 to 52-4 on the downstream side in the gas flow. The coolers 52-1 to 52-4 cool the process fluid which has been heated by being compressed in the compressors 50-1 to 50-4.

The compressor 50-1 on the most upstream side is connected with a scrubber 54-1 on the upstream side. The scrubber 54-1 removes $H_2O$ mist which is entrained in the $CO_2$ recovered in the $CO_2$ recovery device 12 from the scrubber 43. Scrubbers 54-2 and 54-3 are installed on the downstream side of the coolers 52-1 and 52-2, respectively. The scrubbers 54-2 and 54-3 recover the $H_2O$ which has been condensed as the saturated ratio of the $H_2O$ has decreased due to compression.

The dehydration device 60 in this embodiment includes a contactor 62, a still column 72, a flash drum (first recovery part) 74, and a reboiler 82.

The $CO_2$ (process fluid) after being compressed in the compressor 50-2 is supplied, via the $CO_2$ supply line $L_{11}$, from a lower part of the contactor 62 into the contactor 62. A packing 64 is housed in the contactor 62, and the dehydration solvent is diffused from above the packing. The dehydration solvent is a liquid capable of absorbing the $H_2O$ present in the $CO_2$, and triethylene glycol (TEG) and diethylene glycol (DEG) are specific examples of the dehydration solvent. While the diffused dehydration solvent is passing through the packing 64, the $CO_2$ and the dehydration solvent come into countercurrent contact with each other. This causes the $H_2O$ present in the $CO_2$ to be absorbed into the dehydration solvent. Part of the $CO_2$ (about 0.2 to 5%) is also absorbed into the dehydration solvent.

A mist eliminator 66 is installed in an upper part of the contactor 62. The $CO_2$ with the $H_2O$ removed (dry $CO_2$) passes through the mist eliminator 66 and is discharged to the dry $CO_2$ supply line (dry $CO_2$ carrying passage) $L_{12}$.

The dry $CO_2$ discharged from the contactor 62 is cooled through the cooler 68 provided in the dry $CO_2$ supply line $L_{12}$, and thereafter supplied through the dry $CO_2$ supply line $L_{12}$ to the downstream stage-side compressors 50-3 and 50-4 to be compressed there. The $CO_2$ after being compressed in the downstream stage-side compressors 50-3 and 50-4 is utilized for the enhanced oil recovery (EOR) method, for example.

The dehydration solvent having absorbed the $H_2O$ and the $CO_2$ is discharged from the contactor 62 through a dehydration solvent carrying line $L_{21}$ under the packing 64. The dehydration solvent carrying line $L_{21}$ passes from the contactor 62 through the inside of a reflux condenser 70 and is connected with the flash drum 74.

The reflux condenser 70 houses the dehydration solvent carrying line $L_{21}$. As will be described later, gas containing $CO_2$ and $H_2O$ at a high temperature of about 100 to 200° C. flows inside the reflux condenser 70. The dehydration solvent passing through the dehydration solvent carrying line $L_{21}$ is increased in temperature by indirect heat exchange with this high-temperature gas containing $CO_2$ and $H_2O$. The dehydration solvent after heat exchange in the reflux condenser 70 is carried through the dehydration solvent carrying line $L_{21}$ to the flash drum 74.

The dehydration solvent supplied into the flash drum 74 is flashed (evaporated) inside the flash drum 74. During this process, a large part of the $CO_2$ (80% to 90%) and a fraction of the $H_2O$ that have been absorbed are desorbed from the dehydration solvent. Thereby, the CO2 is recovered from the dehydration solvent. The dehydration solvent is accumulated in the bottom part of the flash drum 74. The $H_2O$ and a slight amount (10% to 20%) of the $CO_2$ remain absorbed in the dehydration solvent.

The $CO_2$ recovered in the flash drum 74 and the $H_2O$ are discharged from the flash drum 74 through a released fluid carrying line $L_{31}$ (first circulating passage), and supplied to the flow passage on the upstream side of the contactor 62. In the example shown in FIG. 2, the released fluid carrying line $L_{31}$ is connected with a process fluid flow passage $L_{41}$ on the upstream side in the gas flow of the compressor 50-1. The $CO_2$ recovered by the dehydration device 60, together with the $CO_2$ recovered by the $CO_2$ recovery device 12, is compressed in the compressors 50-1 and 50-2, and carried back to the dehydration device 60.

Depending on the treatment conditions and the compressor specifications, the released fluid carrying line $L_{31}$ may be connected to the upstream side of the second-stage and the subsequent compressors given that the pressure levels match. More specifically, in the example shown in FIG. 2, the released fluid carrying line $L_{31}$ may be connected to a position which is on the downstream side of the compressor 50-1 and the upstream side of the compressor 50-2.

Also in the dehydration-compression system where the dehydration device 60 is installed on the downstream side of the multiple compressors 50, the released fluid carrying line $L_{31}$ may be similarly installed in the flow passage on the upstream side of the compressors 50. In this case, depending on the pressure level, the $CO_2$ and the $H_2O$ released inside the flash drum 74 may be supplied to the process fluid flow passage $L_{41}$ or supplied between the adjacent compressors 50.

In a modified example of this embodiment, the released fluid carrying line $L_{31}$ is connected with the $CO_2$ supply line $L_{11}$. In this case, the $CO_2$ and the $H_2O$ released inside the flash drum 74 are supplied to the $CO_2$ right before it flows into the contactor 62. In this modified example, when there is a large difference between the pressure of the $CO_2$ and $H_2O$ flowing through the released fluid carrying line $L_{31}$ and the pressure of the $CO_2$ flowing through the $CO_2$ supply line $L_{11}$, a compressor is installed as a pressure regulating part (a first regulating part) in the released fluid carrying line $L_{31}$.

This configuration can be applied to the case where the dehydration device 60 is installed on the downstream side of the multiple compressors 50, as well as to the case where the dehydration device 60 is installed on the upstream side of the multiple compressors 50.

The $H_2O$ recovered in the dehydration device 60 is removed from the $CO_2$ by passing through the scrubbers 54-1 to 54-3. As described above, the remaining $H_2O$ is further removed from the $CO_2$ in the contactor 62 of the dehydration device 60.

The connection position of the released fluid carrying line $L_{31}$ is preferably on the upstream side of the scrubber 54-1 (or the scrubber 54-2). The $CO_2$, etc. discharged from the flash drum 74 can contain the dehydration solvent in the form of mist. It is concerned that this dehydration solvent in the form of mist may flow into the compressors 50-1 and 50-2 and affect the performance of the compression function. Therefore, the $CO_2$, etc. desorbed in the flash drum 74 is supplied from the upstream side of the scrubber 54-1 or the scrubber 54-2 so that the dehydration solvent in the form of mist can be removed in the scrubber 54-1 and 54-2.

If the pressure of the $CO_2$ and $H_2O$ discharged from the flash drum 74 is significantly higher than the pressure of the $CO_2$ flowing through the process fluid flow passage $L_{41}$, it is preferable that a pressure reducing valve 76 (a first pressure regulating part) is installed at an intermediate position of the released fluid carrying line $L_{31}$ so as to regulate the pressure level of the $CO_2$ and $H_2O$ supplied from the flash drum 74 to the process fluid flow passage $L_{41}$.

The dehydration solvent carrying line $L_{22}$ connects the flash drum 74 and a filter 78. The dehydration solvent is carried through the dehydration solvent carrying line $L_{22}$ from the bottom part of the flash drum 74 to the filter 78. Solid matters (rust, etc.) contained in the dehydration solvent are removed in the filter 78.

The dehydration solvent carrying line $L_{23}$ connects the filter 78 and the still column 72. The dehydration solvent is discharged from the filter 78, and carried through the dehydration solvent carrying line $L_{23}$ to the still column 72. A heat exchanger 80 is installed midway in the dehydration solvent carrying line $L_{23}$. In the heat exchanger 80, heat exchange is performed between the dehydration solvent discharged from the filter 78 and the dehydration solvent discharged from the reboiler 82 to be described later. The dehydration solvent flowing through the dehydration solvent carrying line $L_{23}$ is heated to about 150° C. by this heat exchange.

The still column 72 houses a packing 88. The dehydration solvent supplied from the dehydration solvent carrying line $L_{23}$ is heated in the still column 72, which causes the $CO_2$ and the $H_2O$ remaining in the dehydration solvent to be released from the dehydration solvent and separated from the dehydration solvent. The released $CO_2$ and $H_2O$ pass through the reflux condenser 70, and are discharged from the reflux condenser 70. While passing through the space where the dehydration solvent carrying line $L_{21}$ is housed as mentioned above, the released $CO_2$ and $H_2O$ are utilized for heat exchange with the dehydration solvent flowing through the dehydration solvent carrying line $L_{21}$.

The dehydration solvent having released the $CO_2$ and the $H_2O$ inside the still column 72 is carried to the reboiler 82 and heated there. The dehydration solvent carrying line $L_{24}$ connects the reboiler 82 and the contactor 62. The heated dehydration solvent is discharged by actuation of the pump 84 from the reboiler 82 through the dehydration solvent carrying line $L_{24}$. In the heat exchanger 80 installed at an intermediate position of the dehydration solvent carrying line $L_{24}$, heat exchange is performed between the dehydration solvent flowing through the dehydration solvent carrying line $L_{23}$ and the dehydration solvent flowing through the dehydration solvent carrying line $L_{24}$. The dehydration solvent after heat exchange is cooled in the cooler 86 before being circulated to the contactor 62.

The dehydration solvent transferred to the reboiler 82 includes a slight amount of the $CO_2$ and the $H_2O$. When the dehydration solvent is heated in the reboiler 82, the residual $CO_2$ and $H_2O$ are released from the dehydration solvent. The reboiler 82 is communicated with the still column 72. The $CO_2$ and the $H_2O$ released inside the reboiler 82 pass through the reflux condenser 70, and are discharged from the reflux condenser 70.

In terms of the $CO_2$ recovery amount of the entire $CO_2$ recovery system, the amount of $CO_2$ discharged from the reflux condenser 70 is slight. The gas discharged from reflux condenser 70 is released to the outside of the dehydration device 60.

In this embodiment, since the $CO_2$ generated during regeneration of the dehydration solvent in the dehydration device 60 is carried to the upstream side of the contactor 62 and dehydrated again, the amount of $CO_2$ loss can be reduced.

Second Embodiment

Figure 3:
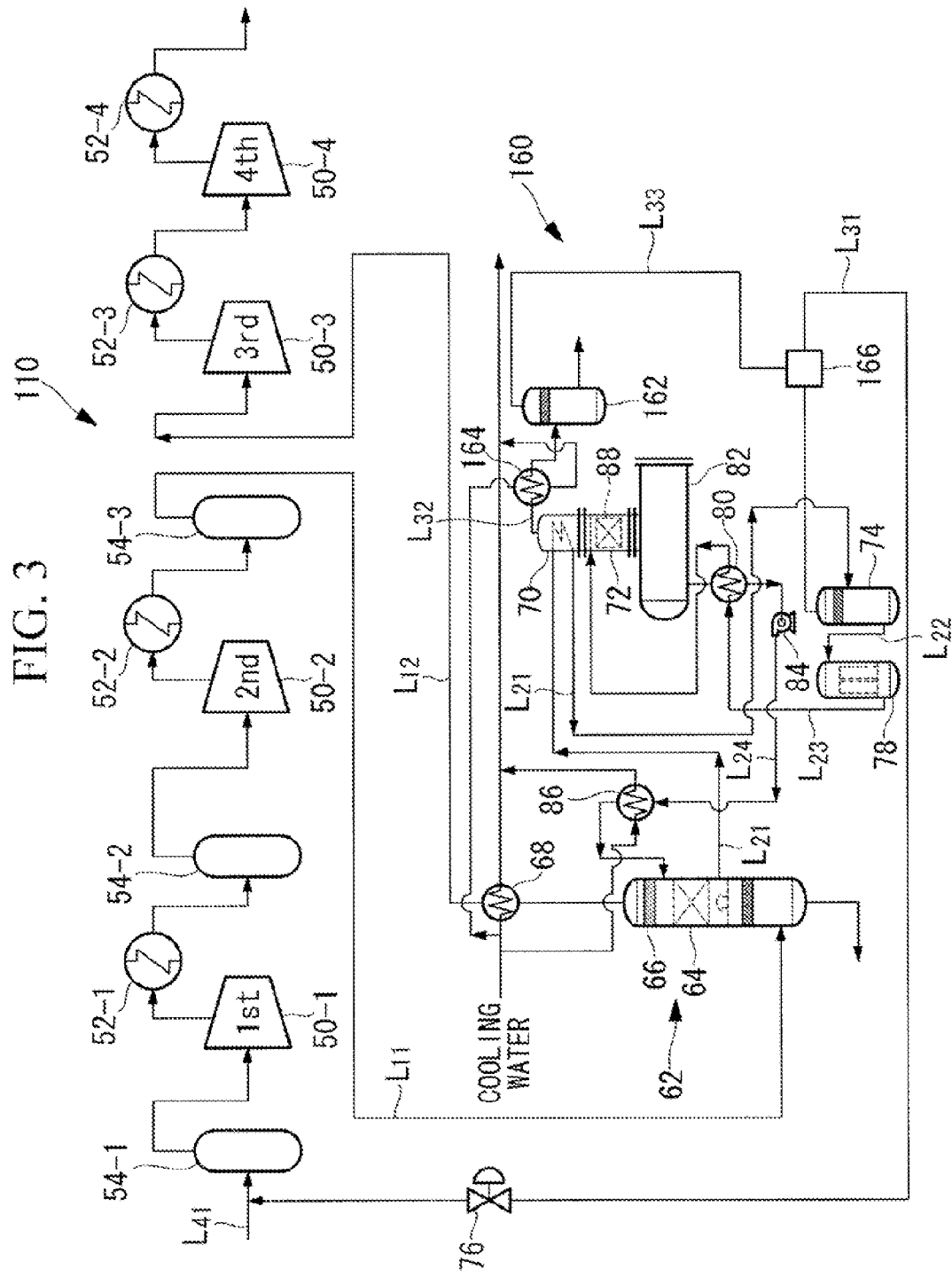
FIG. 3 is a configuration diagram of a dehydration-compression system according to a second embodiment.

FIG. 3 is a configuration diagram of a dehydration-compression system according to a second embodiment. In FIG. 3, components that are the same as those in FIG. 2 are denoted by the same reference signs.

In the following description, a case is taken as an example where a dehydration device 160 is installed between adjacent compressors of the multiple compressors 50; however, the dehydration device 160 may be installed on the upstream side or the downstream side of the multiple compressors 50.

In a dehydration-compression system 110 of the second embodiment, the dehydration device 160 further includes a separator 162, a cooler 164, an ejector (a second pressure regulating part) 166, and released fluid carrying lines $L_{32}$ and $L_{33}$ (second circulating passages). Other components are the same as those in the first embodiment, and dehydration of $CO_2$ and circulation of the dehydration solvent are performed in a process similar to that of the first embodiment.

The separator 162 is connected with the reflux condenser 70 through the released fluid carrying line $L_{32}$. The cooler 164 is installed at an intermediate position of the released fluid carrying line $L_{32}$.

The $CO_2$ and the $H_2O$ released inside the still column (a second recovery part) 72 are discharged from the reflux condenser 70 through the released fluid carrying line $L_{32}$. Thereby, the $CO_2$ is recovered from the dehydration solvent. The $CO_2$ and the $H_2O$ are cooled by cooling water in the cooler 164. The cooled $CO_2$ and $H_2O$ are carried to the separator 162 through the released fluid carrying line $L_{32}$.

Part of the H$_2$O is condensed and separated from the CO$_2$ in the separator 162. The condensed water is accumulated in a bottom part of the separator 162. The accumulated condensed water is extracted by a pump (not shown) from the separator 162 and treated as drain water. The CO$_2$ released and the H$_2$O uncondensed inside the separator 162 are discharged from the separator 162.

The CO$_2$ accompanying the H$_2$O discharged from the separator 162 are carried through the released fluid carrying line L$_{33}$ to the ejector 166.

The ejector 166 is installed at an intermediate position of the released fluid carrying line L$_{31}$. In the ejector 166, the gas discharged from the flash drum 74 and the gas discharged from the separator 162 are mixed.

Here, the gas discharged from the flash drum 74 is at a higher pressure and in a larger amount than the gas discharged from the separator 162. More specifically, the pressure of the gas discharged from the flash drum 74 is 180 to 240 times higher than the pressure of the gas discharged from the separator 162. In addition, the flow rate of the gas discharged from the flash drum 74 is 4 to 8 times larger than the flow rate of the gas discharged from the separator 162. When the gases are mixed in the ejector 166, the lower pressure gas from the separator 162 is pressurized to a pressure almost equal to the pressure of the gas discharged from the flash drum 74.

In FIG. 3, the mixture gas discharged from the ejector 166 is supplied to the process fluid flow passage L$_{41}$ through the released fluid carrying line L$_{31}$.

In a modified example, the released fluid carrying line L$_{31}$ may be connected with the CO$_2$ supply line L$_{11}$ and the mixture gas may be supplied to the CO$_2$ right before the contactor 62.

As with the first embodiment, when the pressure of the CO$_2$ and H$_2$O discharged from the ejector 166 is significantly higher than the pressure of the CO$_2$ flowing through the process fluid flow passage L$_{41}$, it is preferable that the pressure reducing valve 76 is installed at an intermediate position of the released fluid carrying line L$_{31}$ so as to regulate the pressure level of the CO$_2$ and H$_2$O. If the pressure levels match, the released fluid carrying line L$_{31}$ may be connected to a position which is on the downstream side of the first-stage compressor 50-1 and the upstream side of the second-stage and subsequent compressors.

From the viewpoint of removing the dehydration solvent in the form of mist, the mixture gas discharged from the ejector 166 is preferably on the upstream side in the gas flow of the scrubber 54-1 (or the scrubber 54-2).

As the second pressure regulating part, a compressor can be installed instead of the ejector.

In the second embodiment, as the CO$_2$ released in the still column 72 is also circulated to the upstream stage-side compressors 50-1 and 50-2, there is little CO$_2$ loss during the dehydration process. As a result, the compressed CO$_2$ can be obtained at a high yield.

Third Embodiment

Figure 4:
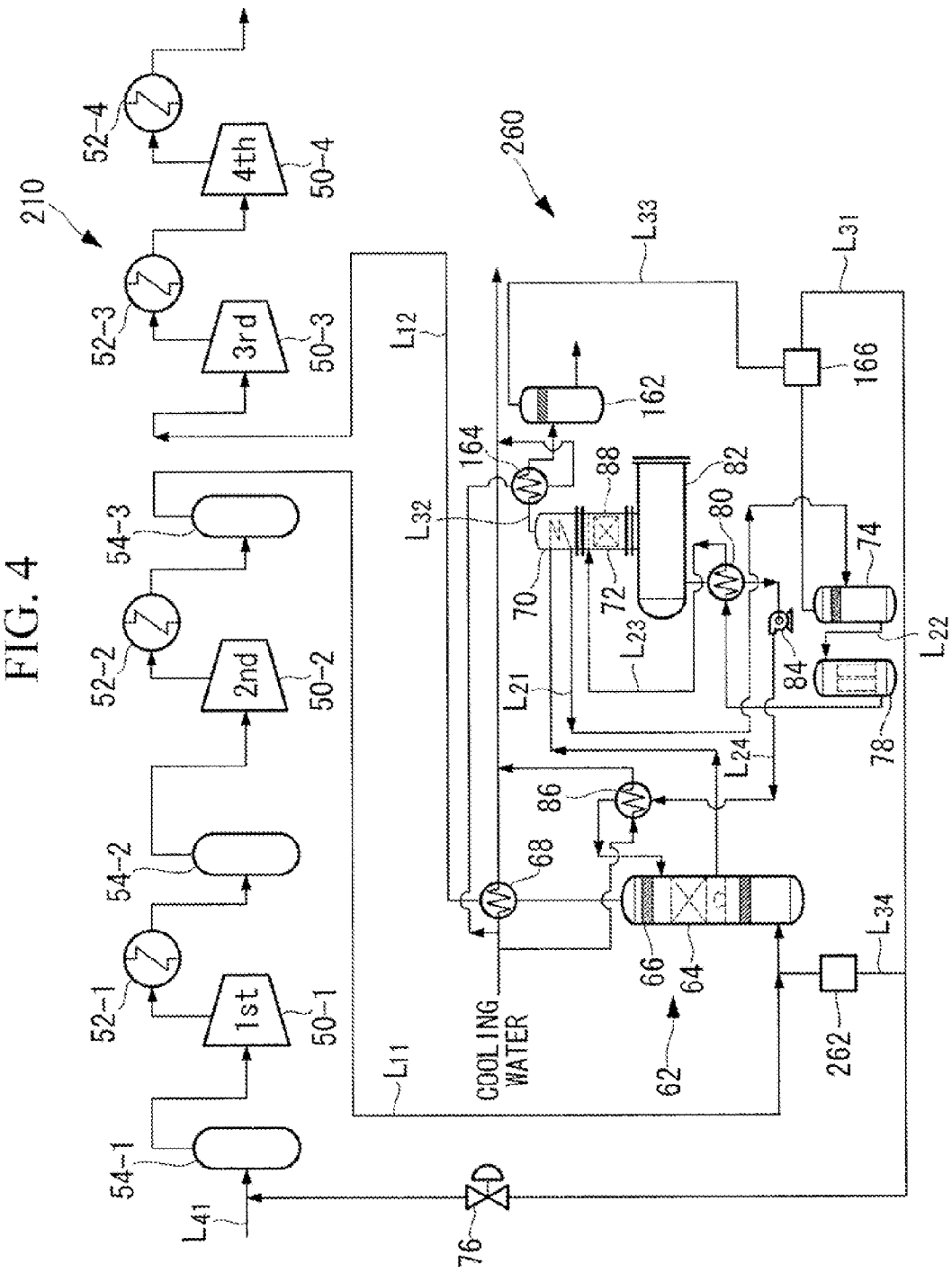
FIG. 4 is a configuration diagram of a dehydration-compression system according to a third embodiment.

FIG. 4 is a configuration diagram of a dehydration-compression system according to a third embodiment. In FIG. 4, components that are the same as those in FIG. 2 and FIG. 3 are denoted by the same reference signs.

In the following description, a case will be taken as an example where a dehydration device 260 is installed between adjacent compressors of the multiple compressors 50; however, the dehydration device 260 may be installed on the downstream side of the multiple compressors 50.

In a dehydration-compression system 210 of the third embodiment, the released fluid carrying line L$_{31}$ branches at an intermediate position, and the branch lines are respectively connected with the process fluid flow passage L$_{41}$ and the CO$_2$ supply line L$_{11}$. As the first pressure regulating part, a branch passage compressor 262 is installed in the released fluid carrying line L$_{34}$ connected with the CO$_2$ supply line L$_{11}$. Other components are the same as those in the second embodiment, and dehydration of the CO$_2$ and circulation of the dehydration solvent are performed in the process similar to that of the first embodiment and the second embodiment.

Part of the CO$_2$ and H$_2$O discharged from the released fluid ejector 166 is supplied through the released fluid carrying line L$_{31}$ to the process fluid flow passage L$_{41}$ on the upstream side of the compressor 50-1. The rest is supplied to the contactor 62 through the released fluid carrying line L$_{34}$ and the CO$_2$ supply line L$_{11}$, and dehydration from the CO$_2$ is performed in the contactor 62.

The process fluid having been compressed in the upstream stage-side compressors 50-1 and 50-2 flows through the CO$_2$ supply line L$_{11}$. On the other hand, since the gas (CO$_2$ and H$_2$O) flowing through the released fluid carrying line L$_{31}$ is discharged from the flash drum 74, this gas is at a lower pressure than that of the process fluid flowing through the CO$_2$ supply line L$_{11}$. More specifically, the gas passing through the released fluid supply line L$_{31}$ is at a pressure about 0.1 to 0.2 times as high as the pressure of the process fluid flowing through the CO$_2$ supply line L$_{11}$. Therefore, to merge the gas flows, the gas flowing through the released fluid carrying line L$_{33}$ is pressurized in the branch passage compressor 262 to match the pressure levels.

Also in the configuration of the third embodiment, the recovery rate of the CO$_2$ released from the dehydration solvent in the dehydration system 260 can be enhanced.

REFERENCE SIGNS LIST

10 Dehydration-compression system
22 CO$_2$ absorbing tower
30 Absorbing liquid regenerating tower
50 (50-1 to 50-4) Compressor
52 (52-1 to 52-4) Cooler
54 (54-1 to 54-3) Scrubber
60, 160, 260 Dehydration device
62 Contactor
64, 88 Packing
66 Mist eliminator
68 Cooler
70 Reflux condenser
72 Still column
74 Flash drum
76 Pressure reducing valve
78 Filter
80 Heat exchanger
82 Reboiler
84 Pump
86, 164 Cooler
162 Separator
166 educator
262 Branch passage compressor

What is claimed is:
1. A dehydration-compression system comprising:
multiple compressors for compressing CO$_2$ containing H$_2$O; and
a dehydration device for separating the H$_2$O from the CO$_2$, wherein the dehydration device comprises:
a contactor which removes the $H_2O$ from the $CO_2$ by bringing the $CO_2$ and a dehydration solvent into contact with each other and absorbing the $H_2O$ into the dehydration solvent;
a dry $CO_2$ carrying passage where the $CO_2$ with the $H_2O$ removed flows through;
a first recovery part which recovers the $CO_2$ from the dehydration solvent discharged from the contactor; and
a first circulating passage which carries the $CO_2$ discharged from the first recovery part, to a flow passage on an upstream side of the contactor,
wherein the dehydration device is installed between adjacent compressors of the multiple compressors with respect to a flow of the $CO_2$ or on the downstream side of the multiple compressors, and
wherein the first circulating passage branches at an intermediate position, and is connected with the flow passage on the upstream side of the compressor located on the upstream side of the contactor, and is connected with a flow passage between the compressor and the contactor.

2. The dehydration-compression system according to claim 1, wherein the dehydration device is installed on the upstream side of the multiple compressors.

3. The dehydration-compression system according to claim 1, further comprising a first pressure regulating part, which regulates the pressure of the $CO_2$ flowing through the first circulating passage, at an intermediate position of the first circulating passage.

4. The dehydration-compression system according to claim 1, wherein a scrubber is installed on the upstream side of the compressors, and the $CO_2$ flowing through the first circulating passage is carried to the upstream side of the scrubber.

5. The dehydration-compression system according to claim 1, wherein a scrubber is installed on the upstream side of the compressors, and the $CO_2$ flowing through the first circulating passage is carried to the upstream side of the scrubber.

6. A $CO_2$ recovery system comprising:
a $CO_2$ absorbing tower which brings exhaust gas containing $CO_2$ and a $CO_2$ absorbing liquid into contact with each other to remove the $CO_2$ present in the exhaust gas;
an absorbing liquid regenerating tower which causes the $CO_2$ absorbing liquid having absorbed the $CO_2$ in the $CO_2$ absorbing tower to release the $CO_2$; and
the dehydration-compression system according to claim 1 which compresses the $CO_2$ released in the absorbing liquid regenerating tower and removes the $H_2O$ contained in the $CO_2$.

7. The dehydration-compression system according to claim 1, comprising a second recovery part which recovers the $CO_2$ from the dehydration solvent discharged from the first recovery part, wherein
the second recovery part and the first circulating passage are connected in a second circulating passage, and the $CO_2$ discharged from the second recovery part is carried to the upstream side of the contactor.

8. The dehydration-compression system according to claim 7, wherein a second pressure regulating part is installed at an intermediate position of the first circulating passage, and the second circulating passage is connected with the second pressure regulating part, the second pressure regulating part regulating the pressure of the $CO_2$ discharged from the second recovery part and mixing the $CO_2$ discharged from the second recovery part with the $CO_2$ discharged from the first recovery part.

* * * * *